United States Patent [19]

Ten Berge

[11] Patent Number: 4,669,820

[45] Date of Patent: Jun. 2, 1987

[54] OPTICAL FIBER TERMINATION METHOD, TERMINAL SPLICE AND CONNECTOR THEREFOR

[75] Inventor: Eduardus F. A. Ten Berge, Drunen, Netherlands

[73] Assignee: AMP Incorporated, Harrisburg, Pa.

[21] Appl. No.: 820,580

[22] Filed: Jan. 17, 1986

Related U.S. Application Data

[63] Continuation of Ser. No. 501,984, Jun. 6, 1983, abandoned.

[30] Foreign Application Priority Data

Jun. 5, 1982 [GB] United Kingdom ................ 8216433

[51] Int. Cl.⁴ .............................................. G02B 6/36
[52] U.S. Cl. ............................. 350/96.20; 350/96.21; 350/320; 427/163
[58] Field of Search ....................... 350/96.20

[56] References Cited

U.S. PATENT DOCUMENTS

| 3,999,837 | 12/1976 | Bowen et al. |
|---|---|---|
| 4,033,668 | 7/1977 | Presby ............................ 350/96.20 |
| 4,173,393 | 11/1979 | Maurer . |
| 4,183,618 | 1/1980 | Rush et al. ....................... 350/96.18 |
| 4,185,883 | 1/1980 | Ckowen et al. . |
| 4,205,897 | 6/1980 | Stankos . |
| 4,390,237 | 6/1983 | Marazzi . |
| 4,407,561 | 10/1983 | Wysocki . |
| 4,435,038 | 3/1984 | Soes et al. . |
| 4,474,429 | 10/1984 | Yoldas et al. ..................... 350/320 |

FOREIGN PATENT DOCUMENTS

| 2531994 | 7/1975 | Fed. Rep. of Germany . |
|---|---|---|
| 54-74453 | 6/1979 | Japan . |
| 0058117 | 4/1982 | Japan .............................. 350/96.2 |
| 0154203 | 9/1982 | Japan .............................. 350/96.2 |
| WO82/01543 | 5/1982 | PCT Int.'l Appl. . |
| 1477680 | 12/1974 | United Kingdom . |
| 1585899 | 4/1977 | United Kingdom . |
| 2034068A | 5/1980 | United Kingdom ............ 350/96.20 |
| 2084345 | 9/1980 | United Kingdom . |

OTHER PUBLICATIONS

Solid State Technology, Feb. 1974 Kuo: "Electrical Applications of Thin-Films Produced by Metallo-Organic Deposition".

EDN, vol. 25, No. 15 Aug. 20, 1980, "Technology News: Fiber Connectoring/Splicing Techniques Promise to Solve Cost Handling.

Optik, Ud 53, No. 3 (1979) pp. 231-233 On Line-Metal Coating Problems "p. 3577 of Optical Fibre", Almeida et al.

Primary Examiner—John Lee
Attorney, Agent, or Firm—Robert W. J. Usher

[57] ABSTRACT

An optical fiber termination is provided by a short length of fiber (41) formed with a coaxial metal coating and with optical end faces. One end (43) of the short coated length (42) is of reduced diameter to facilitate matching with a fiber (45) to be terminated to which the one end (43) is spliced. The splice comprises a resiliently deformable alignment body (49) having a fiber alignment passageway (50) and disposed between support bushings (44, 51) having fiber passageways and encased within a crimping sleeve (48). The coated fiber length (42) projects externally of the splice assembly and the fiber (45) to be terminated is abutted with the one end (43) of the coated length within the alignment passageway (50). The crimping sleeve (48) is radially compressed to deform the alignment body (49) about the abutted ends to effect alignment, the support bushings (44, 51) constraining the alignment body (49) against axial extrusion and being secured during the crimping process by indentations (60, 61). The projecting coated portion (42) may be releasably connected with a complementary member in a resilient alignment in plug-and-socket manner.

41 Claims, 17 Drawing Figures

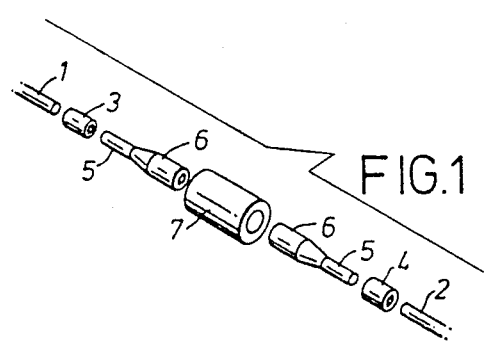
FIG.1
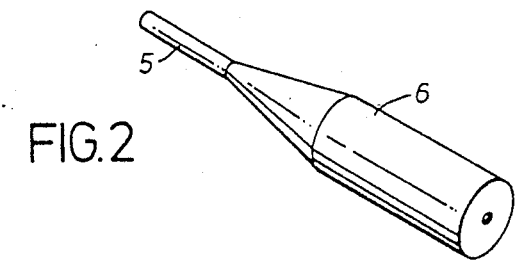
FIG.2
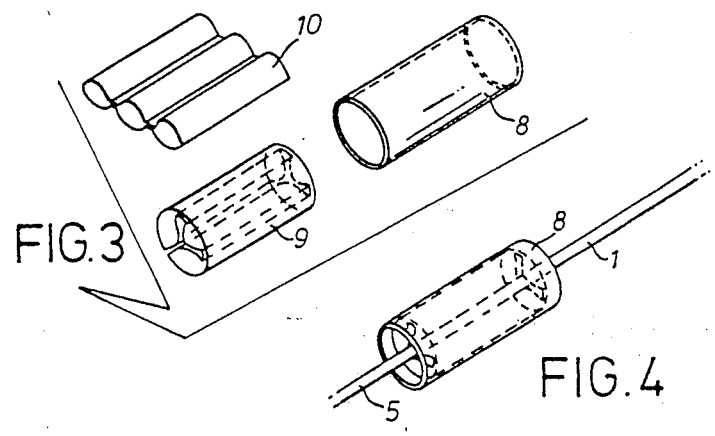
FIG.3
FIG.4

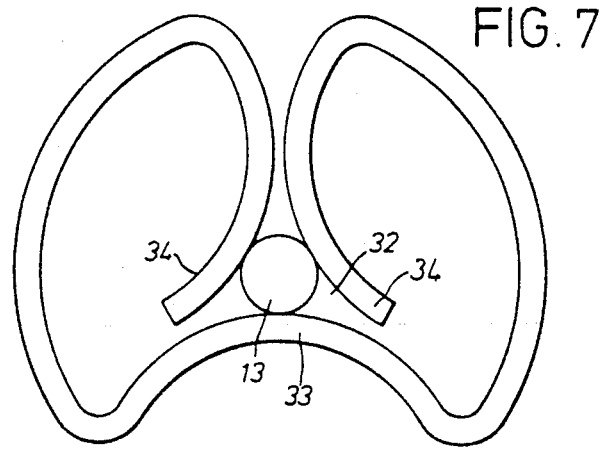
FIG. 7
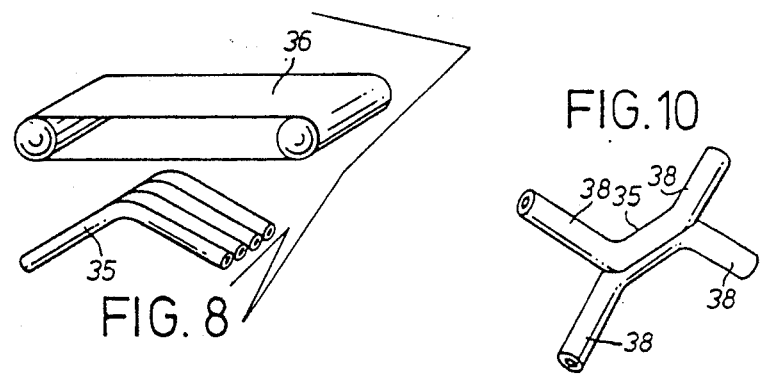
FIG. 8
FIG. 10
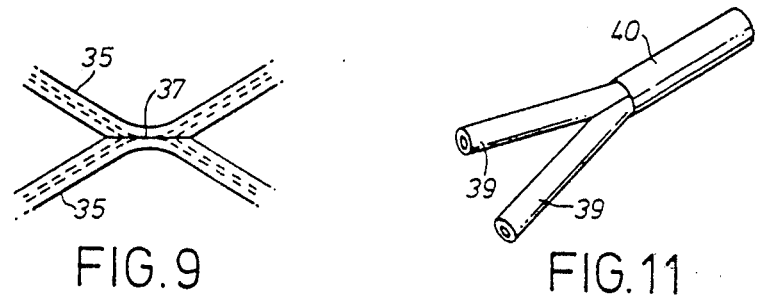
FIG. 9
FIG. 11

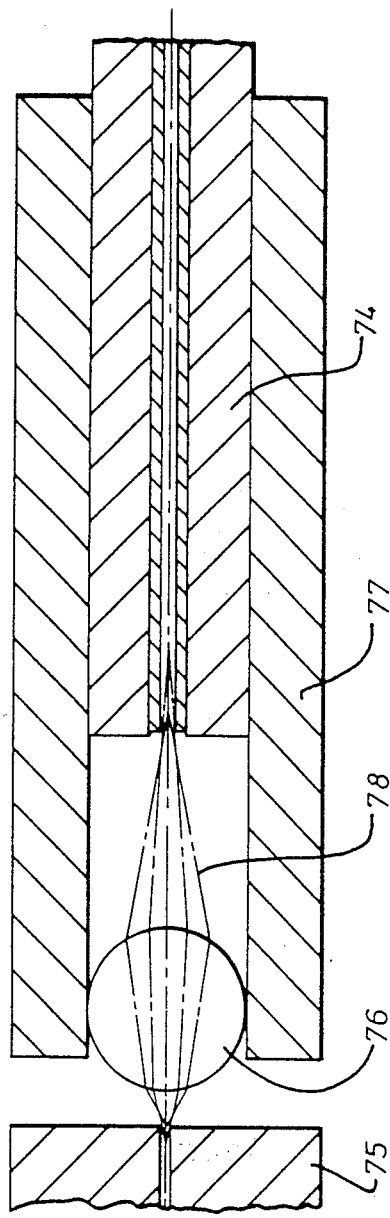
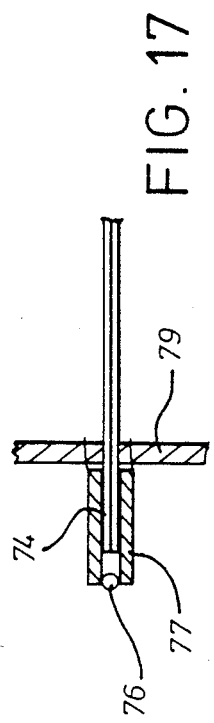
FIG. 16
FIG. 17

OPTICAL FIBER TERMINATION METHOD, TERMINAL SPLICE AND CONNECTOR THEREFOR

This application is a continuation of application Ser. No. 501,984 filed June 6, 1983 (now abandoned).

FIELD OF THE INVENTION

This invention relates to an optical fiber termination technique and product which is useful in releasable fiber optic connections.

BACKGROUND OF THE INVENTION

It is known to terminate optical fibers by ferrule members at which optically flat exposed fiber ends may be formed to facilitate concentric seating in a bore of an alignment member adapted to be engaged by aligned optical fiber terminations at opposite ends, and thereby install a disconnectable optical fiber connection. Reference is made, for example, to AMP Incorporated U.S. Pat. No. 3,999,837.

It has also been proposed by GTE Laboratories in Technology News EDN Aug. 20, 1980, to provide a releasable two-part connector in each part of which a short length of optical fiber has one end centered in a bushing and the other end disposed in an elastomeric splice ferrule adapted to receive the end of an optical fiber in abutting relationship with the other end of the short fiber in a permanent connection. The arrangement is such that the bushings of the two parts are brought into engagement with the ends of the short fiber lengths in aligned face-to-face abutting relationship at an interface between the bushings.

It has also been proposed to interconnect or splice optical fibers by aligning end portions in a bore of a deformable alignment member and to deform the member about the fibers to secure them in aligned juxtaposition.

SUMMARY OF THE INVENTION

It is an object to present a technique for terminating an optical fiber, and an optical fiber termination whereby connection between terminated fibers can be more easily and/or more economically made.

According to the present invention, a method of terminating an optical fiber is characterized by forming a short length of optical fiber with a relatively rigid coating of uniform thickness, forming ends of the coated length with optical surfaces, and splicing the coated length at one end to the end of a fiber to be terminated.

This enables a fiber to be terminated by means which can more readily be connected in the field than can a plain fiber.

Suitably, after forming the optical surfaces, part of the coating is removed over an end portion of the coated length to define a reduced diameter end portion which is spliced to the fiber to be terminated.

This facilitates alignment of the spliced ends of the coated length and the fiber to be terminated by matching the diameter of the spliced portions more closely.

Suitably, the coating is of metal and comprises an initial thin electroless coating of uniform thickness and a further relatively thick electroplated coating of uniform thickness.

A paper published in *Solid State Technology* of February 1974 by C. Y. Kuo of the Electro-Metallics Department of Englehard Industries Division of Englehard Minerals & Chemicals Corporation, Newark, N.J., entitled "Electrical Applications of Thin-Films Produced by Metallo-Organic Deposition" discusses advantageous means whereby an initial thin coating may be obtained by electroless plating using the so-called MOD techniques.

After forming the metal-coated fiber length with optical faces, the coated fiber length, at least at one end, is suitably subject to a further plating operation to define an annular raised section around the optical face at that end, the other end being spliced to the fiber to be terminated. The raised section assists in protecting the optical face.

It has been found that a fiber core of 100 microns diameter may be coated with metal to an outer diameter of 500 microns concentric within one micron with the core.

In order to carry out the technique, a substantial length of fiber may be formed with a uniform relatively rigid coating before being chopped into short lengths which are then formed with the optical surfaces. A multiplicity of chopped lengths are suitably mounted in spaced parallel relation in a holding fixture so that a multiplicity of optical faces may be formed simultaneously by conventional grinding and polishing techniques.

The invention includes an optical fiber terminal for carrying out the method of the invention and which is characterized by a short length of optical fiber having a relatively rigid coating of uniform thickness and formed at opposite ends with optical surfaces.

Suitably, the coating at one end portion is thick relative to that at the other end portion, defining at the other end portion a reduced diameter section for splicing to a fiber to be terminated.

The coating is preferably made of metal, the fiber is of a diameter in the range of 50 to 125 microns, and the coated fiber has an outer diameter of 500 microns concentric with the core to within one micron.

Suitably, at least at one end, the coated fiber length is formed with an annular raised section around the optical surface defined by an extension of the coating beyond the optical surface.

For forming the splice between the fiber to be terminated and the short fiber length, many known techniques and devices are available. If the splice is to be formed under factory or laboratory conditions, a fusion or welding technique is appropriate to give a low-loss splice connection. However, such splice joints require expensive tooling and skilled workmanship and are generally not suitable or economic for field application.

A suitable technique for field application is the crimp technique in which ends of the fiber to be terminated and of the short fiber length are aligned within an alignment bore of a deformable alignment body contained within a metal crimping sleeve. Crimping to effect radial compression of the sleeve secures the fiber ends in alignment.

The invention includes an optical fiber terminated according to the method of the invention and characterized in that the coated fiber length and the fiber to be terminated are aligned in a deformable alignment body having an alignment passageway in which the length and the fiber to be terminated are disposed end-to-end, the alignment body being contained within a metal crimping sleeve which is radially crimped to resiliently deform the alignment body about the abutted ends of the coated length and the fiber to be terminated, the coated length projecting from the alignment body at one end.

Suitably, the crimping sleeve extends beyond the alignment body at opposite ends around support bushings, one at each end, the bushings having axial passageways for the coated fiber and the terminated fiber respectively, and engaging and axially constraining opposite ends of the alignment member under compression, indentations in the crimping sleeve securing the support bushings against movement apart, and the coated fiber projecting from the associated support bushing. Preferably, the coated fiber has a relatively thick coating over that portion projecting from the alignment body and a relatively thin coating over that portion within the alignment body.

The invention also includes a fiber optic splice for use according to the method of the invention which comprises a resiliently deformable alignment body having a central alignment passage for optical fibers and is characterized in that the crimping sleeve extends beyond the alignment body at opposite ends and a support bushing having a central fiber passageway is disposed within each end of the sleeve adjacent the alignment body, each support bushing having a peripheral recess whereby, on crimping the sleeve about the alignment body and the bushings, the sleeve may be indented into the recesses to secure the bushings in abutment with opposite ends of the alignment body and the alignment body is under axial compression.

Suitably, the alignment body is formed of material selected from the group comprising eutectic lead-tin alloy, super-plastic zinc, aluminum of grain size of the order of 30 microns, super-plastic aluminum having a grain size of the order of five microns, and EPDM rubber, and the bushings may be of malleable metal such as brass.

In order to connect ends of fibers terminated according to the invention, the exposed ends of the coated short fiber lengths are inserted into opposite ends of an alignment bore or passage in an alignment member, suitably into close juxtaposition. Due to their relatively rigid form because of the coatings, the ends may be inserted into passageways in a close fit where substantial axial insertion forces may be required.

The invention includes a male connector comprising a fiber optic splice according to the invention characterized by a coated optical fiber length according to the invention mounted in the fiber passageway of the support bushing at one end, the coated fiber projecting on opposite sides of the bushing, one end extending externally of the splice and the other extending into the alignment passageway of the alignment body.

The invention also includes a female connector comprising a fiber optic splice according to the invention characterized in that the crimping sleeve at one end extends beyond the support bushing and a coated optical fiber according to the invention is mounted in the fiber passageway of the bushing at that end, the coated fiber projecting on opposite sides of the bushing, one end extending coaxially into the sleeve extension and the other end extending into the alignment passageway of the alignment body, a resilient alignment member being mounted in the sleeve extension and having an alignment passageway embracing the end of the coated fiber within the sleeve, and having an alignment passageway portion extending away therefrom for reception of a complementary coated fiber.

An alignment member may be resilient, for example, folded from sheet metal to define an alignment passageway of lesser diameter than that of the fiber ends to be inserted but having resilient wall parts which may be sprung apart on insertion of the fiber ends.

For use in a connector housing, the terminated fiber is suitably mounted in a spring loaded carrier having latching means for latching the carrier in the housing, and spring loading means arranged to be compressed on engagement of the connector housing with a complementary housing and to bias the projecting end of the coated fiber length axially towards a complementary aligned fiber end in a complementary housing through an intermediate alignment member.

Suitably, the spring loading means is provided in only one of the connector housings.

The invention may be applied not only to the termination of individual fibers for connection to individual complementary fibers, but also to coupling members for coupling together two or more fibers for connection to another or more than one other fiber.

To this end, coated short lengts of fiber may be bent to define a curved optical path and parts of the coating removed at the external surfaces of the bends to define optical surfaces at which the fiber core is exposed, the optical surfaces of a pair being abutted and the coatings around the abutting surfaces being bonded, for example, by fusion or soldering.

The invention includes a method of joining two or more metal-coated fibers according to the invention which includes forming at least two of the coated fibers with optical faces extending lengthwise, abutting the optical faces and bonding the metal coatings surrounding the faces to effect a joint.

An optical fiber terminal according to the invention is suitably coupled to a lens by mounting the lens in the bore of a tube within which the optical fiber terminal is a close sliding fit.

The invention will now be described by way of example with reference to the accompanying partly diagrammatic drawings.

BRIEF DESCRIPTION OF THE DRAWINGS

FIG. 1 is a fragmentary exploded view of a connector assembly for terminating a pair of optical fibers and releasably connecting the terminated ends.

FIG. 2 is a perspective view to an enlarged scale of an intermediate short fiber length of the assembly of FIG. 1.

FIG. 3 is a perspective exploded view of a crimp slice.

FIG. 4 is a perspective view of the assembled splice of FIG. 3.

FIG. 7 is an end view of a spring form alignment member for use in a connector of the kind shown in FIGS. 5 and 6 or assembly of FIG. 1.

FIGS. 8 and 9 illustrate successive steps in the manufacture of a four-way coupling member.

FIG. 10 is a perspective view of a four-way coupling member.

FIG. 11 is a perspective view of a three-way coupling member.

FIG. 16 is a fragmentary sectional elevation of a coupling between an optical needle and a laser.

FIG. 17 is a similar view to a reduced scale illustrating the mounting of the coupling in the casing of a laser device.

DETAILED DESCRIPTION OF THE INVENTION

Figure 5:
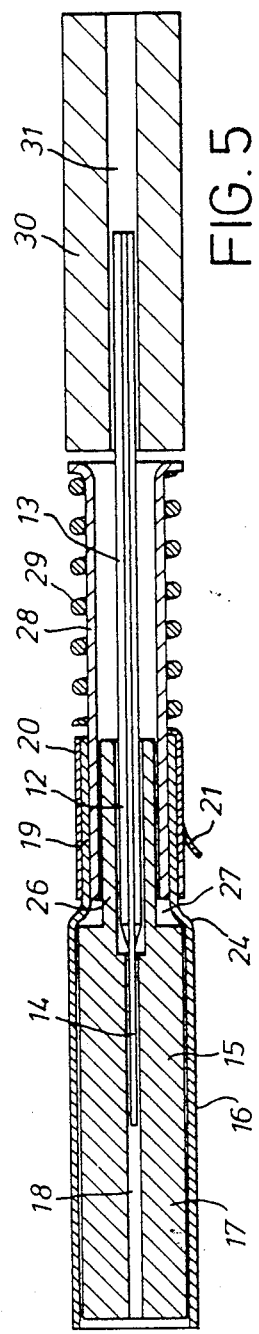
FIG. 5 is a sectional side elevation of a fiber optic termination suitable for assembly in a connector housing for mating with a complementary connector.

In the arrangement of FIG. 1, optical fibers 1 and 2 are arranged for insertion into rear ends of splice ferrules 3, 4 which at their other ends are arranged to receive the rear reduced diameter ends 5 of coated intermediate short fiber lengths 6. The forward larger diameter ends of the coated fiber lengths 6 are axially insertable with a close fit into opposite ends of an alignment member 7 having a through passageway within which the ends of the lengths 6 may abut.

The intermediate short fiber lengths 6 are, as shown in FIG. 2, formed with a metallic coating which has been etched away at the rear end 5 to reduce the diameter to that of the fiber 1 to which it it to be spliced. As has been described above, both ends of the fiber length 6 are suitably formed with an optical surface before the etching process.

The enlarged forward end of fiber 6 is of suitably controlled length so the position of the forward face may be accurately determined by location of its rear end.

The splice assembly of FIG. 3 comprises a cylindrical crimping ferrule 8 adapted to contain a deformable alignment member 9 formed from a deformable plastic extrusion 10, folded up to define an axial through passageway, and radially extending voids for accommodating circumferential deformation of the plastic. In use, as shown in FIG. 4, the member 9 is contained within the ferrule and the end of a fiber length 1 inserted axially from one end to abut the end of the reduced portion 5 of a short coated fiber length 6 before reducing the ferrule 8 by crimping to secure the ends in the splice. During crimping, axial forces are suitably applied to opposite ends of the alignment member 9 by use of a suitable tool to resist longitudinal extrusion of the alignment member 9 and to resist axial movement of the fiber ends apart.

The splice of FIGS. 3 and 4 and its method of assembly is more fully disclosed in and forms the subject of U.S. Pat. No. 4,435,038.

In FIG. 5, a coated fiber length 12 formed generally as shown in FIG. 2 with an enlarged diameter forward portion 13 and a reduced diameter tail 14 is positioned with the tail 14 extending into the through passageway of a crimp-splice assembly 15. The assembly 15 comprises an outer metal crimping ferrule 16 containing a deformable member 17 having a through passageway 18 for reception of the tail 14 at one end and an optical fiber to be terminated at the other, to be secured by crimping the ferrule 16.

Figure 6:
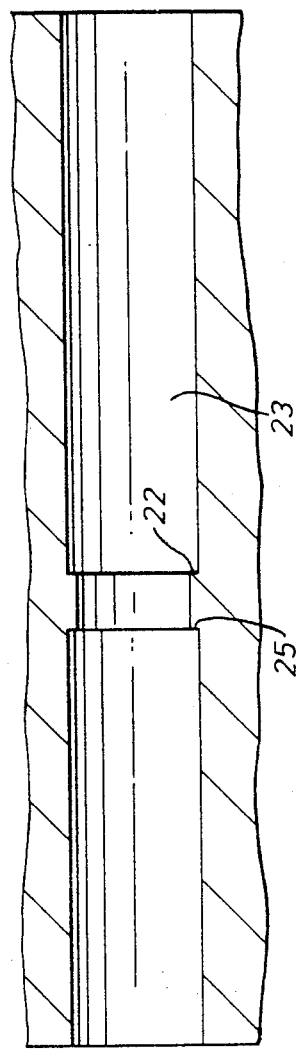
FIG. 6 is a fragmentary sectional elevation of part of a multi-way connector housing for the termination of FIG. 5.

The ferrule 16 at its forward end has an extension 19 slidably received within a latch collar 20 having a latch 21 for latching the assembly in the housing of FIG. 6 by engagement with a shoulder 22 in the passage 23 thereof, the forward end 24 of the ferrule presenting a shoulder for engaging housing abutment 25.

A forward extension 26 of the deformable plastic member 17, of reduced diameter, supports the rear end of the enlarged diameter portion 13 of the fiber length 12, and presents an annular space 27 within the ferrule extension 19 which receives a rear end of a metal sleeve 28 carrying a biasing spring 29 acting against the forward end of the collar 20 and biasing the sleeve 28 and with it the fiber portion 13 forwards. The fiber portion 13 projects through the sleeve 28 and forwardly into one end of an alignment member 30 having a through passageway 31 within which the fiber portion 13 is a close fit. The fiber portion terminates approximately mid-way through the passageway 31 to leave a residual passageway portion for receipt of a projecting fiber portion of a complementary connector (not shown).

After the assembly of FIG. 5 has been spliced to an optical fiber at the crimp-splice assembly 15, it is inserted into the housing passageway of FIG. 6 from left to right to register the ferrule shoulder 24 with the housing shoulder 25 to engage the latch 21 with the abutment 22. The alignment member 30 is assembled from the right of FIG. 6 to abut the forward end of the sleeve 28 and receive the forward portion of the coated fiber 13 within its passageway 31.

A complementary connector is generally similar except that the alignment member is omitted and suitably also the biasing spring. Thus, a coated fiber length projects forwardly from a mating face of the complementary connector and, on mating engagement of the two connectors, the complementary coated fiber penetrates the residual passageway portion 31 of the alignment member to abut the end of the fiber portion 13. Suitably, the alignment member 30 displaces the sleeve 28 to the left against the bias of the spring 29 to ensure that the abutted fiber ends are biased together by the spring force.

The alignment member 30 may be formed as shown in FIG. 7 as a spring member folded from sheet metal to define an axial passageway 32 encompassed on three sides by an arcuate base 33 and a pair of arcuate spring arms 34, convex inwards to define the passageway 32 of generally triangular configuration for receiving the fiber portion 13 in a spring fit. Suitably, at opposite ends of the alignment member 30, the base 33 and spring arms 34 are formed radially outwards of the passageway 32 to define flared entrance sections to facilitate axial insertion of the coated fiber ends.

FIG. 8 shows diagrammatically the formation of optical coupling members. Short coated fiber lengths 35 are bent through an obtuse angle and arranged in a group with the external sides at the bend faced up to a surface grinder 36 adapted to grind away the coating and form an optical surface 37 at which the fiber core is exposed. A pair of such bent coated fiber lengths 35 may then be faced up, as shown in FIG. 9, with the optical surfaces 37 in register and secured together by bonding the coatings. Suitably, as described above, the coatings are preferably metallic and the bonding may be by welding or soldering to form a four-ended optical coupling device as shown in FIG. 10. Ends 38 of the coated fiber lengths 35 of the device of FIG. 10 may be connected to optical fibers by crimp-splices as described above.

In an alternative arrangement as shown in FIG. 11, a pair of short coated fiber lengths 39 are optically connected at an angle to a common coated fiber length 40 by similar techniques to define a three-ended coupler or splitter device. Such a device may be used, for example, to couple a pair of optical fibers to an active device at a releasable connection. To this end, the ends of the fiber lengths 39 may be crimp-spliced to the optical fibers and the fiber length 40 mounted in a connector generally as described with reference to FIGS. 5 and 6.

The male optical fiber connector of FIG. 12 comprises a short metal coated fiber length 41 corresponding to that shown in and described in connection with FIG. 2 and, for concise identification, hereinafter referred to as an optical needle. The optical needle 41 comprises a forward portion 42 of enlarged diameter compared to a rearward portion 43, the forward portion 42 being supported coaxially in and projecting forwardly from a support bushing 44 and the rearward portion 43 being spliced in axial alignment with the stripped end 45 of an optical fiber 46 extending from its cable covering 47.

The splice is formed generally as described with reference to FIGS. 3 and 4 but it is further improved. The splice comprises an outer metal sleeve 48 containing in a middle portion an alignment member 49, generally of the form disclosed in FIG. 3 and folded to define an axial through passageway 50 accommodating the rearward portion 43 of the optical needle 41 and the stripped end 45 of the optical fiber 46. The sleeve 48 extends forwardly and rearwardly beyond the alignment member 49 and, in its forward extension, accommodates the support bushing 44 coaxially with the alignment member 49 and, at its rearward extension, accommodates a fiber support bushing 51 in similar manner. The support bushings 44 and 51 abut forward and rearward ends of the alignment member 49 and adjacent the abutting ends are formed with respective external annular grooves 52 and 53 of generally V-shape.

The fiber support bushing 51 has a rearward extension 54 of reduced diameter surrounding the optical fiber 46 with an enlarged bore 55 progressively reducing at a convergent portion 56 to a reduced diameter portion 57 adjacent the alignment member 49.

The through passageway 50 defined by the folded alignment member 49 has flared entry portions 58, 59 at opposite ends to facilitate entry of the optical needle portion 43 and the fiber end 45 and suitably defined by chamfers on the ends of the folded sections of the alignment member 49.

The splice assembly is preassembled with the optical needle 41 and the optical fiber 46 arranged to enter the forward end 45 into the alignment member 49 substantially to abut the rearward end of the needle portion 43. The sleeve 48 is then crimped about the alignment member 49 to effect precise axial alignment between the fiber end 45 and the needle portion 43. Simultaneously, the sleeve portion surrounding the support bushings 44 and 51 are similarly crimped and indented into the grooves 52 and 53 at annular indentations 60 and 61. This serves to exert an axial constraint against ends of the alignment member 49 during the crimping process and also to thereafter to protect against the effects of creep of the material of the alignment member 49 and undesirable relaxation of its alignment function.

In forming the splice, it has been found that the alignment member 49 should be of material having a fine grain size in the micron range, because rough grain size materials buckle the fiber during crimping by micro-bending causing undesirable transmission losses. Eutectic tin-lead alloy and so-called super-plastic zinc have been found acceptable for grain size but suffer from creep in use, particularly with temperature cycling. A more satisfactory material is aluminum having a grain size of about 30 microns which does not suffer substantially from creep. A further material is super-plastic aluminum produced by the British Aluminum Company which has a grain size of about five microns and is resistant to creep. Some rubbers form suitable materials and a rubber known as EPDM produced by the Dutch company DSM is suitable, having excellent resistance to creep. The bushings 44 and 51 are suitably of malleable metal, e.g., brass, and during crimping are urged axially inwards to exert axial constraint on the central alignment member 49. The indentations 60, 61 serve to maintain that constraint after crimping to resist creep relaxation of the member 49.

Figure 12:
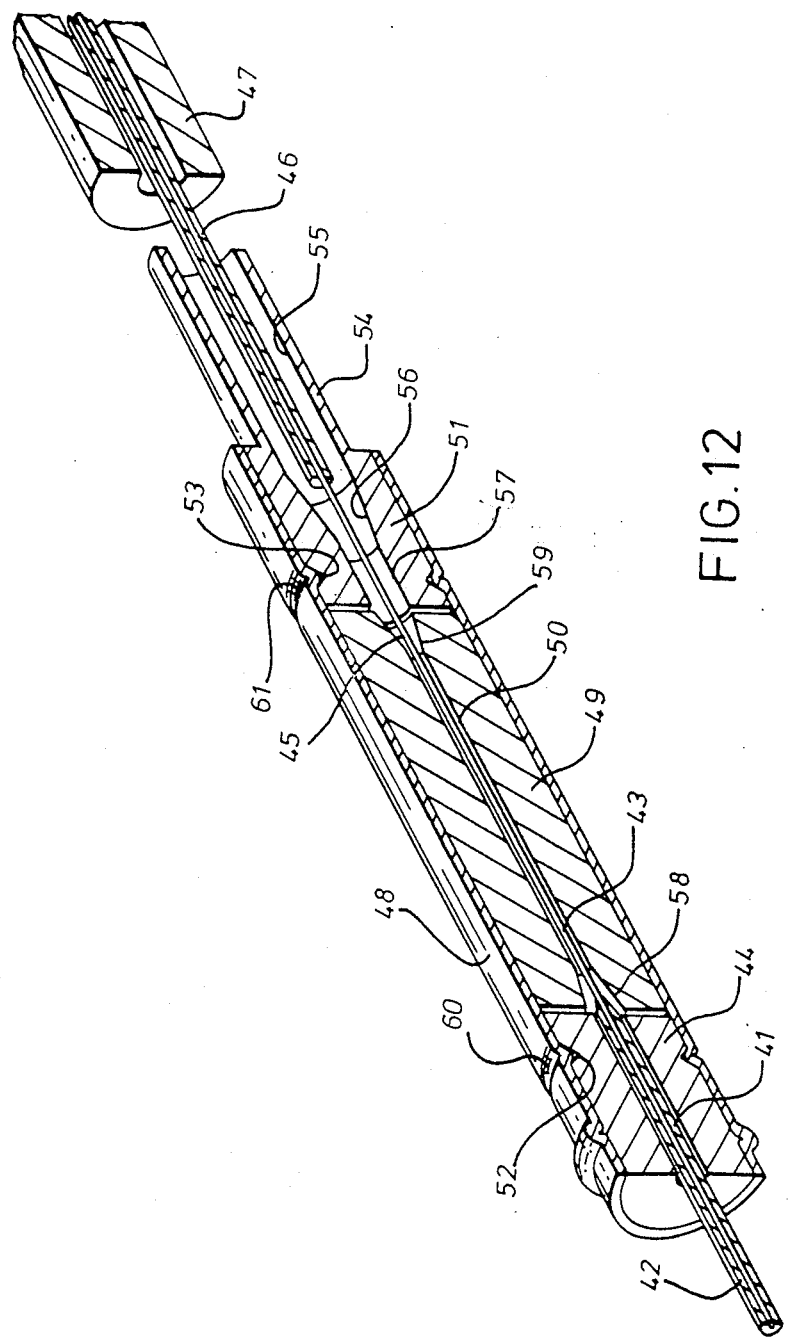
FIG. 12 is a sectional perspective view of a male contact.
Figure 13:
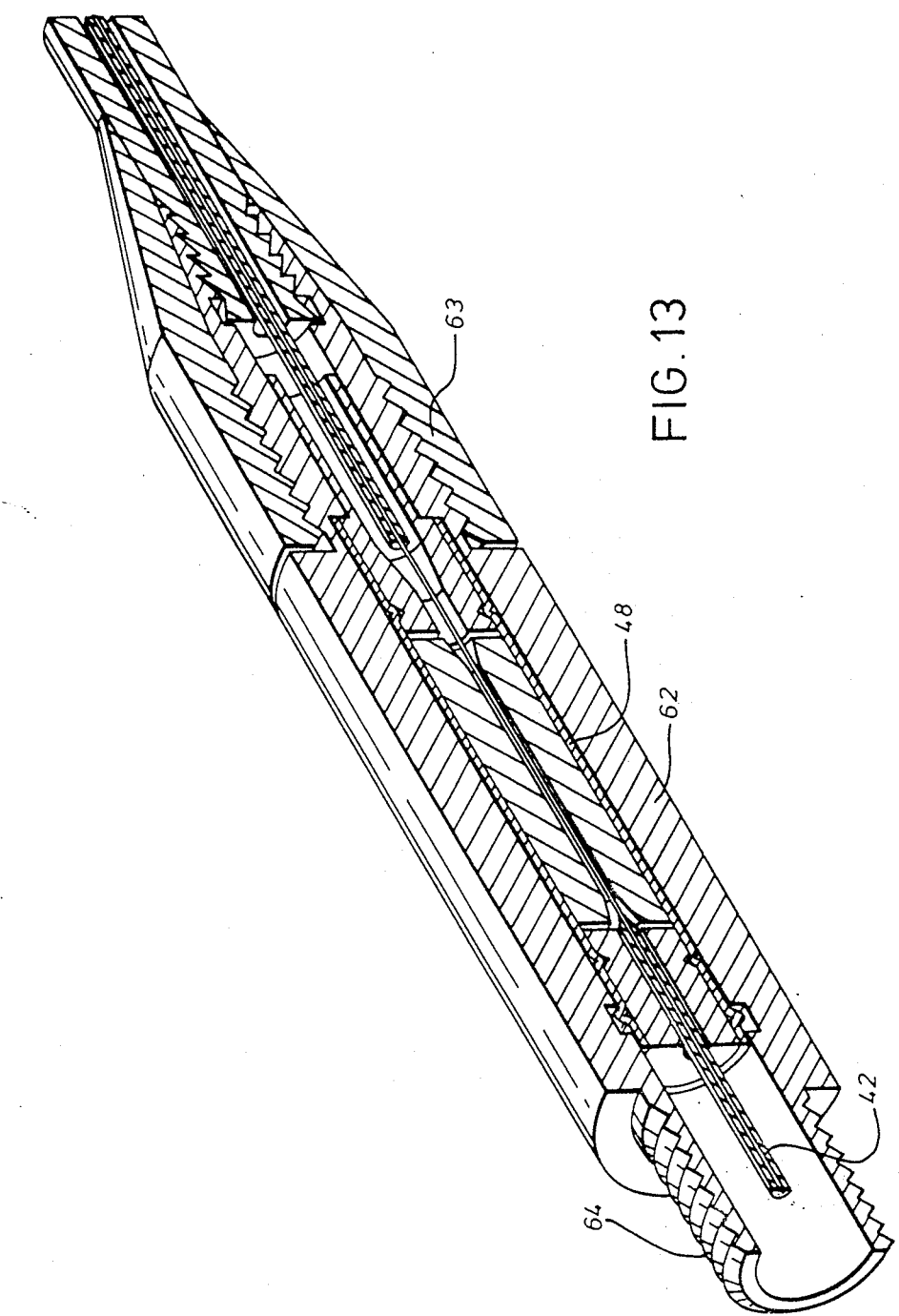
FIG. 13 is a view similar to that of FIG. 12 of the male contact assembled into a male connector.

The male connector of FIG. 12 is suitably mounted, as shown in FIG. 13, in a cylindrical housing body 62, supporting the splice sleeve 48 and at its rearward end having a screw-fitted cable clamp 63 for clamping the optical fiber cable 47 to the connector. At its forward end the housing body 62 has an externally threaded extension 64 formed with a bore surrounding the forwardly projecting needle part 42 and is adapted to receive a complementary female connector to be described in connection with FIGS. 14 and 15.

Figure 14:
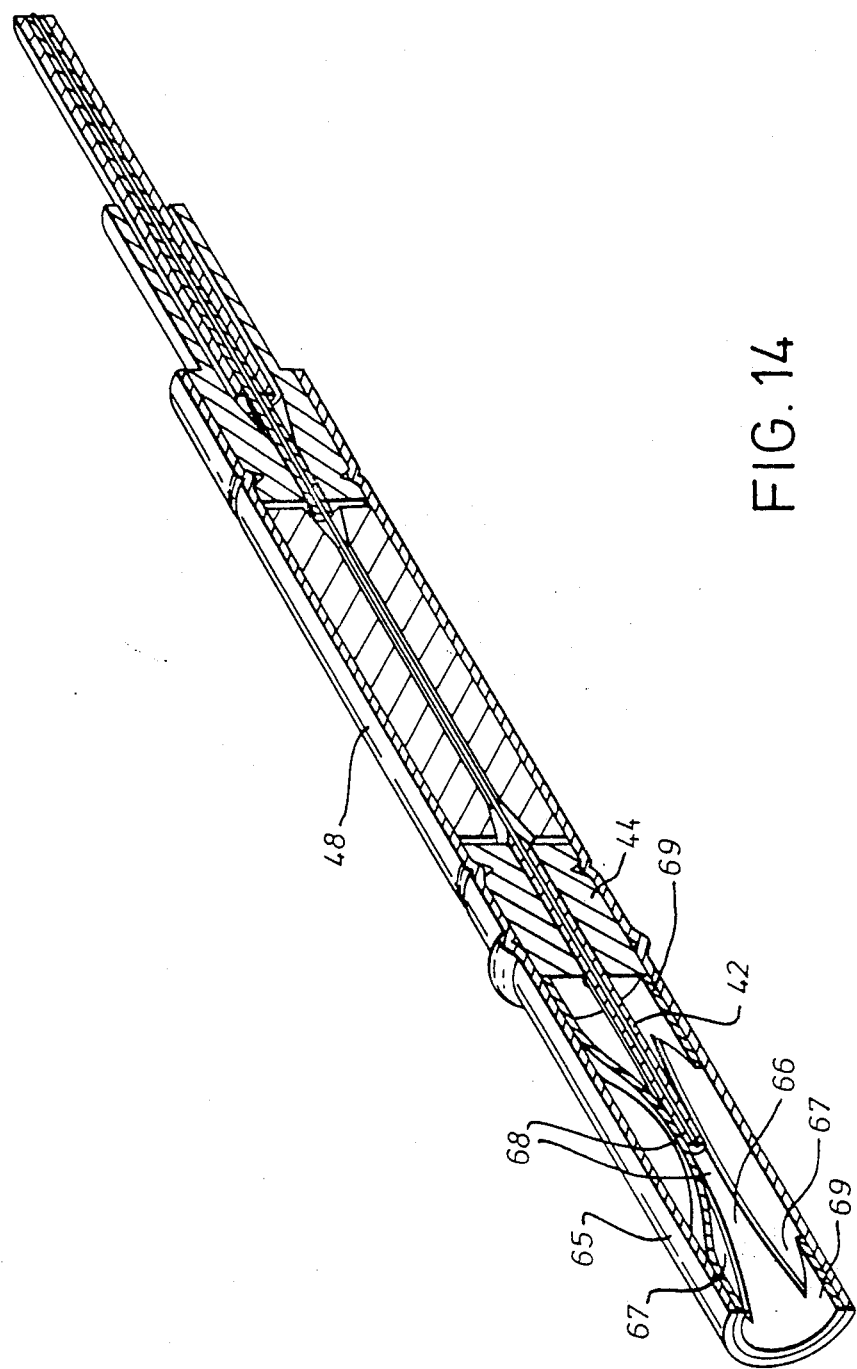
FIG. 14 is a sectional perspective view of a female contact.

The complementary female connector as shown in FIG. 14 is formed similarly to that of the male connector described in connection with FIG. 12 but the forward end of the sleeve 48 is extended at 65 forwardly beyond the needle support bushing 44 by substantially twice the length of the projecting needle portion 42. The sleeve extension 65 encases a resilient alignment member 66, defining a through passageway receiving the projecting needle portion 42. The alignment member 66 comprises a cylinder rolled up from a sheet metal blank, punched with apertures 67 to define three spring arms 68 extending between cylindrical end portion 69 of the member 66, the arms being bowed inwardly to define at a center section of the member a constricted passageway of lesser diameter than the fiber portion 42 when in a relaxed condition. The cylindrical end portions 69 fit closely within the sleeve extension 65 and the forward end of needle portion 42 is resiliently clamped between the arms 68 at a mid-point of the alignment member 65.

As an alternative to the metal alignment member 66, an alignment member of resilient elastomeric material may be formed in the manner of the alignment member 10 of the splice of FIG. 3, presenting a through passageway of a diameter less than the thickened portion 42 of the optical needle so that, on insertion of the needle into the passageway, resilient deformation of the alignment member takes place.

Figure 15:
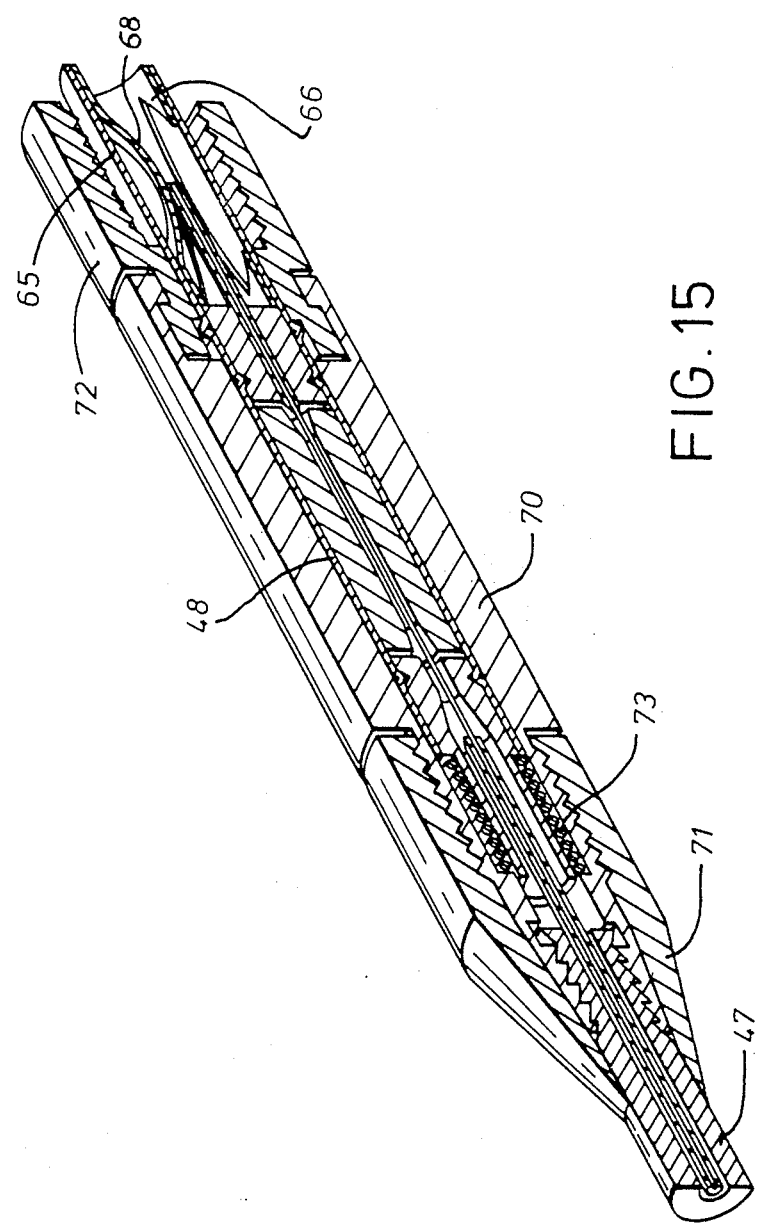
FIG. 15 is a view similar to that of FIG. 14 but viewed from the opposite side, assembled into a female connector.

As shown in FIG. 15, the female connector is suitably mounted in housing body 70 surrounding the splice section of the sleeve 48 and having at its rearward end a screw-fitted cable clamp 71 for the optical cable 47. At its forward end, surrounding the sleeve extension 65, the housing 70 is formed with a rotatable coupling sleeve 72 internally threaded and radially spaced from the sleeve extension 65 to receive the threaded forward end 65 of the male connector of FIG. 14. A biasing spring 73 is mounted within the housing 70 to bias the sleeve 48 forwardly and to accommodate rearward movement thereof when the male and female connectors are mated.

On mating of the connectors of FIGS. 13 and 15, the projecting needle portion 42 of the male connector is entered into the alignment member 66 to be resiliently gripped by the springs 68 and centered with the needle of the female connector. As the coupling sleeve 72 is tightened onto the threaded male connector portion 64, the forward needle portions 42 are drawn into abutment and the spring 73 is slightly compressed.

FIG. 16 illustrates the coupling of an optical needle 74 to a laser 75 by means of a sapphire lens 76. The laser 75 is optically aligned with the axis of a metal tube 77 accurately bored to accept the optical needle 74 in a close fit at one end and, at the other end, to accept the sapphire lens 76. The needle 74 is positioned axially of the tube 77 to collect the focussed laser beam as indicated by the light lines 78. Suitably, as shown in FIG. 17, the tube 77 is mounted at an aperture in the wall 79 of a container for the laser 75 and the needle 74 projects externally of the casing where it may be spliced to a fiber cable in the manner of the connector of FIGS. 11 and 12, or it may be received within the alignment member of a female connector corresponding to that of FIGS. 14 and 15.

I claim:

1. A method of terminating an optical fiber characterized by forming a short length of optical fiber with a relatively rigid coating of uniform thickness comprising an inner relatively thin electrolessly plated metal coating and an outer and relatively thick coating of electroplated metal of uniform thickness, forming each of the ends of the coated length with a corresponding optical surface, and splicing the coated length at one end to the end of the fiber to be terminated.

2. A method as claimed in claim 1, characterized in that after forming the optical surfaces part of the outer coating is removed over an end portion of the coated length (6) to define a reduced diameter end portion (5) which is spliced to the fiber (2) to be terminated.

3. A method as claimed in claim 1 or claim 2, characterized in that after forming the optical surfaces, the coated fiber length (6) is subject to a further plating operation, at least at one end to define an annular raised section around an optical face at that end, the other end being spliced to the fiber (2) to be terminated.

4. An optical fiber terminal for carrying out the method of claim 1, characterized by a short length of optical fiber (6) having a relatively rigid coating of uniform thickness and formed at opposite ends with optical surfaces.

5. An optical fiber terminal as claimed in claim 4, characterized in that the coating at one end portion is thicker relative to the coating at the other end portion, thereby defining at the other end portion a reduced diameter section (5) for splicing to an optical fiber.

6. An optical fiber terminal as claimed in claim 4 or claim 5, characterized in that the coating is of metal and comprises an initial thin coating of uniform thickness and of electroless plated metal and an outer relatively thick coating of electroplated metal of uniform thickness.

7. An optical fiber terminal as claimed in claim 6, characterized in that the fiber is of diameter in the range of 50 to 125 microns and the coated fiber has an outer diameter of the order of 500 microns concentric with the core to within one micron.

8. An optical fiber terminal as claimed in claim 6, characterized in that at one end the coated length is formed with an annular raised section around the optical surface defined by an extension of the coating beyond the optical surface.

9. A method of joining two or more optical fiber terminals as claimed in claim 6 to form an optical splitter or coupler which includes forming at least two of the coated fibers (35, 39) each with a corresponding optical face extending lengthwise, abutting the optical faces, and bonding the metal coatings surrounding the faces to effect a joint.

10. An optical fiber terminal as claimed in claim 4 coupled to a lens (76), characterized in that the lens (76) is mounted in the bore of a tube (77) within which the optical fiber terminal (74) is a close sliding fit.

11. An optical fiber terminated according to the method of claim 1, characterized in that the coated fiber length (41) and the fiber (45) to be terminated are aligned in a deformable alignment body (49) having an alignment passageway (50) in which the coated length (41) and the fiber (45) to be terminated are disposed end-to-end, the alignment body (49) being contained within a metal crimping sleeve (48) which is radially crimped resiliently to deform the alignment body (49) about the abutted ends of the coated length (41) and the fiber (45) to be terminated, the coated length (42) projecting from the alignment body (49).

12. A terminated optical fiber as claimed in claim 11, characterized in that the crimping sleeve (48) at opposite ends extends beyond the alignment body (49) around support bushings (44, 51), one at each end, the bushings (44, 51) having axial passageways for the coated fiber (41) and the terminated fiber (47) respectively and engaging axially constraining opposite ends of the alignment (49) under compression, indentations (60, 61) in the crimping sleeve (48) securing the support bushings (44, 51) against movement apart, and the coated fiber (42) projecting from the associated support bushing (44).

13. A terminated optical fiber as claimed in claim 11 or claim 12, characterized in that the coated fiber length (41) has a relatively thick diametric coating over that portion (42) projecting from the alignment body (49) and a relatively thin diametric coating over that portion (43) within the alignment body (49).

14. A terminated optical fiber as claimed in claim 11, characterized in that the crimping sleeve (16) is supported in a spring-loaded carrier (20, 28, 29) mounted in a connector housing, spring-loaded means (29) being arranged to be compressed on engagement of the connector housing with a complementary housing to bias the coated fiber length (14) axially towards a complementary optical member in the complementary housing.

15. A fiber optic splice for use according to the method of claim 1, and comprising a tubular crimping sleeve (48) containing a resiliently deformable alignment body (49) having a central alignment passage (50) for optical fibers (43, 45) characterized in that the crimping sleeve (48) extends beyond the alignment body (49) at opposite ends and a support bushing (44, 51) having a central fiber passageway is disposed within each end of the sleeve (48) adjacent the alignment body (49) each support bushing (44, 51) having a peripheral recess (52, 53) within the sleeve (48) whereby on crimping the sleeve (48) about the alignment body (49) and the bushings (44, 51) the sleeve (48) may be indented (60, 61) into the recesses (52, 53) to secure the bushings (44, 51) in abutment with opposite ends of the alignment body (49) and the alignment body (49) is placed under axial constraint.

16. A splice as claimed in claim 15, characterized in that the alignment body (49) is formed of material selected from the group consisting of eutectic lead-tin alloy, super-plastic zinc, aluminum of grain size of the order of 30 microns, super-plastic aluminum having a grain size of the order of 5 microns, and EPDM rubber.

17. A splice as claimed in claim 15 or claim 16 characterized in that the support bushings (44, 51) are of malleable metal such as brass.

18. A fiber optic male connector comprising a fiber optic splice as claimed in claim 14, characterized in that a coated optical fiber in an optical fiber terminal according to any of claims 5 to 9 is mounted in the fiber passageway of the support bushing (44) at one end, the coated optical fiber (41) projecting on opposite sides of the support bushing (44), one end (42) extending externally of the splice and the other end (43) extending into the alignment passageway (50) of the alignment body (49).

19. A fiber optic female connector comprising a fiber optic splice as claimed in claim 15, characterized in that the crimping sleeve (48) at one end (65) extends beyond the support bushing and a coated optical fiber (42) in an optical fiber terminal according to any one of claims 5 to 9 is mounted in the fiber passageway of that support bushing, the coated fiber (42) projecting on opposite sides of the support bushing, one end extending coaxially into the sleeve extension (65) and the other extending into the alignment passageway of the alignment body, a resilient alignment member (66) being mounted in the sleeve extension (65) and having an alignment passageway embracing the end of the coated fiber (42) within the sleeve extension (65), the alignment member (66) resiliently engaging the coated fiber and having an alignment passageway portion extending away therefrom for reception of a complementary coated fiber.

20. An optical fiber terminal for coupling to an optically transmissive means, comprising a short length portion of an optical fiber having a relatively rigid coating of substantially uniform thickness comprising a relatively thin inner coating of electrolessly plated metal and a relatively thick outer coating of electroplated metal of uniform thickness, each end of the optical fiber having a corresponding optically transmissive surface, the outer coating encircles a corresponding optically transmissive surface that is optically coupled to a complementary optical member, and the outer coating is abutted rigidly against a rigid, nontransmissive portion of the complementary optical member.

21. A method of making a rigid optical fiber length for terminating an optical fiber by splicing in optical alignment therewith, which method comprises the steps of providing a short length of optical fiber with a metallic coating of uniform thickness, extending throughout and between ends of said length and comprising an inner thin electrolessly plated coating of uniform thickness and an outer relatively thick electroplated coating of uniform thickness, forming opposite ends of the coated length with corresponding optical surfaces, and splicing the coated length at one end to the end of the fiber to be terminated.

22. A method as claimed in claim 21, characterised in that after forming the optical surfaces part of the coating is removed over an end portion of the length to define a reduced diameter end portion which is spliced to the fiber to be terminated.

23. A method as claimed in claim 22, characterised in that the coating is removed over the end part to reduce the diameter over the end portion to match that of the fiber to be terminated.

24. A method as claimed in claim 23, characterised in that after forming the optical surfaces, the coated fiber length is subject to a further plating operation, at least at one end, to define an annular raised section around an optical surface at that end defined by an axial extension of the coating beyond the optical surface, the other end being spliced to the fiber to be terminated.

25. A method of joining two or more optical fiber terminals as claimed in claim 24 to form an optical splitter or coupler which includes forming at least two of the coated fibers with optical faces extending lengthwise, abutting the lengthwise optical faces and bonding the metal coatings surrounding the faces to effect a joint.

26. A method as claimed in claim 22, characterised in that after forming the optical surfaces, the coated fiber length is subject to a further plating operation, at least at one end, to define an annular raised section around an optical surface at that end defined by an axial extension of the coating beyond the optical surface, the other end being spliced to the fiber to be terminated.

27. An optical fiber terminal for carrying out the method of claim 22 comprising a short, rigid length of optical fiber having a relatively rigid metal coating of uniform thickness extending over one end portion thereof, opposite ends of said fiber being formed as optical surfaces, and said coated one end portion defining an enlarged diameter section compared with the other end portion of said length.

28. An optical fiber terminal as claimed in claim 27, characterised in that said other end portion has a diameter matching that of the fiber to which it is to be spliced.

29. An optical fiber termination comprising a terminal as claimed in claim 28, spliced to and in optical alignment with an extending length of relatively flexible optical fiber.

30. An optical fiber terminal as claimed in claim 28, characterised in that at the said one end, the coated length is formed with an annular raised section around the optical surface defined by an extension of the coating axially beyond the optical surface.

31. An optical fiber terminal as claimed in claim 27, characterised in that at the said one end, the coated length is formed with an annular raised section around the optical surface defined by an extension of the coating axially beyond the optical surface.

32. A method as claimed in claim 21, characterised in that after forming the optical surfaces, the coated fiber length is subject to a further plating operation, at least at one end, to define an annular raised section around an optical surface at that end defined by an axial extension of the coating beyond the optical surface, the other end being spliced to the fiber to be terminated.

33. An optical fiber terminal for carrying out the method of claim 21 comprising a rigid, short length of optical fiber having a relatively rigid metal coating of uniform thickness extending throughout and between opposite ends of said length and comprising an inner thin electrolessly plated coating of uniform thickness and an outer relatively thick electroplated coating of uniform thickness, the opposite ends of the fiber length being formed as corresponding optical surfaces.

34. An optical fiber terminal as claimed in claim 33, characterised in that the short fiber length is of diameter in the range of 50 to 125 micron and the coated fiber on the enlarged diameter one end portion thereof has an outer diameter of the order of 500 micron concentric with the core to within one micron.

35. An optical fiber terminal as claimed in claim 33, characterised in that at one end, the coated length is formed with an annular raised section around the optical surface defined by an extension of the coating axially beyond the optical surface.

36. An optical fiber terminated according to the method of claim 21, characterised in that the relatively rigid coated fiber length and the fiber to be terminated are aligned in a deformable alignment body having an alignment passageway in which the coated length and the fiber to be terminated are disposed end-to-end, the alignment body being contained within a metal crimping sleeve which is radially crimped resiliently to deform the alignment body about the abutted ends of the coated length and the length to be terminated, the relatively rigid coated length projecting from the alignment body.

37. A terminated optical fiber as claimed in claim 36, characterised in that the crimping sleeve at opposite ends extends beyond the alignment body around support bushings, one at each end, the bushings having axial passageways for the coated fiber and the terminated fiber, respectively, and engaging axially constraining opposite ends of the alignment body under compression, indentations in the crimping sleeve securing the support bushings against movement apart, and the coated fiber projecting from the associated support bushing.

38. A fiber optic female connector comprising a terminated fiber as claimed in claim 37, characterised in that the crimping sleeve at the end of the coated fiber extends beyond the support bushing and the coated optical fiber which extend coaxially into the sleeve extension, a resilient alignment member being mounted in the sleeve extension and having an alignment passageway embracing the end of the coated fiber within the sleeve extension, the alignment member resiliently engaging the coated fiber and having an alignment passageway portion extending away therefrom for reception of a complementary coated fiber.

39. A terminated optical fiber as claimed in claim 36, characterised in that the coated fiber length has a relatively thick diameter coating over that portion projecting from the alignment body and a relatively thin diameter coating over that portion within the alignment body.

40. A terminated optical fiber as claimed in claim 36, characterised in that the crimping sleeve is supported in a spring-loaded carrier mounted in a connector housing, the spring-loading means being arranged to be compressed on engagement of the connector housing with a complementary housing to bias the coated fiber length axially towards a complementary optical member in the complementary housing.

41. A fiber optic male connector comprising a terminated fiber as claimed in claim 36, characterised in that the coated fiber projects from the associated support bushing and the crimping sleeve to form a male connector.

* * * * *

UNITED STATES PATENT OFFICE
CERTIFICATE OF CORRECTION

Patent No. 4,669,820　　　　　　　　　　Dated June 2, 1987

Inventor(s) Eduardus F.A. Ten Berge

It is certified that error appears in the above-identified patent and that said Letters Patent are hereby corrected as shown below:

In Col. 10, line 36, after "alignment" add --body--.

In Col. 11, line 16, change "5 to 9" to --4 to 8--.

In Col. 11, lines 27-28, change "5 to 9" to --4 to 8--.

Signed and Sealed this

Ninth Day of February, 1988

Attest:

DONALD J. QUIGG

Attesting Officer　　　　Commissioner of Patents and Trademarks